INVENTOR.
ARTHUR R. KETCHAM
BY W. A. Schaich
Leonard S. Goubier
ATTORNEYS

June 16, 1964 A. R. KETCHAM 3,137,560
APPARATUS FOR CONDITIONING GLASS PARISON MOLDS
Filed Jan. 7, 1960 5 Sheets-Sheet 2

INVENTOR.
ARTHUR R. KETCHAM
BY
ATTORNEYS

INVENTOR.
ARTHUR R. KETCHAM
BY
ATTORNEYS

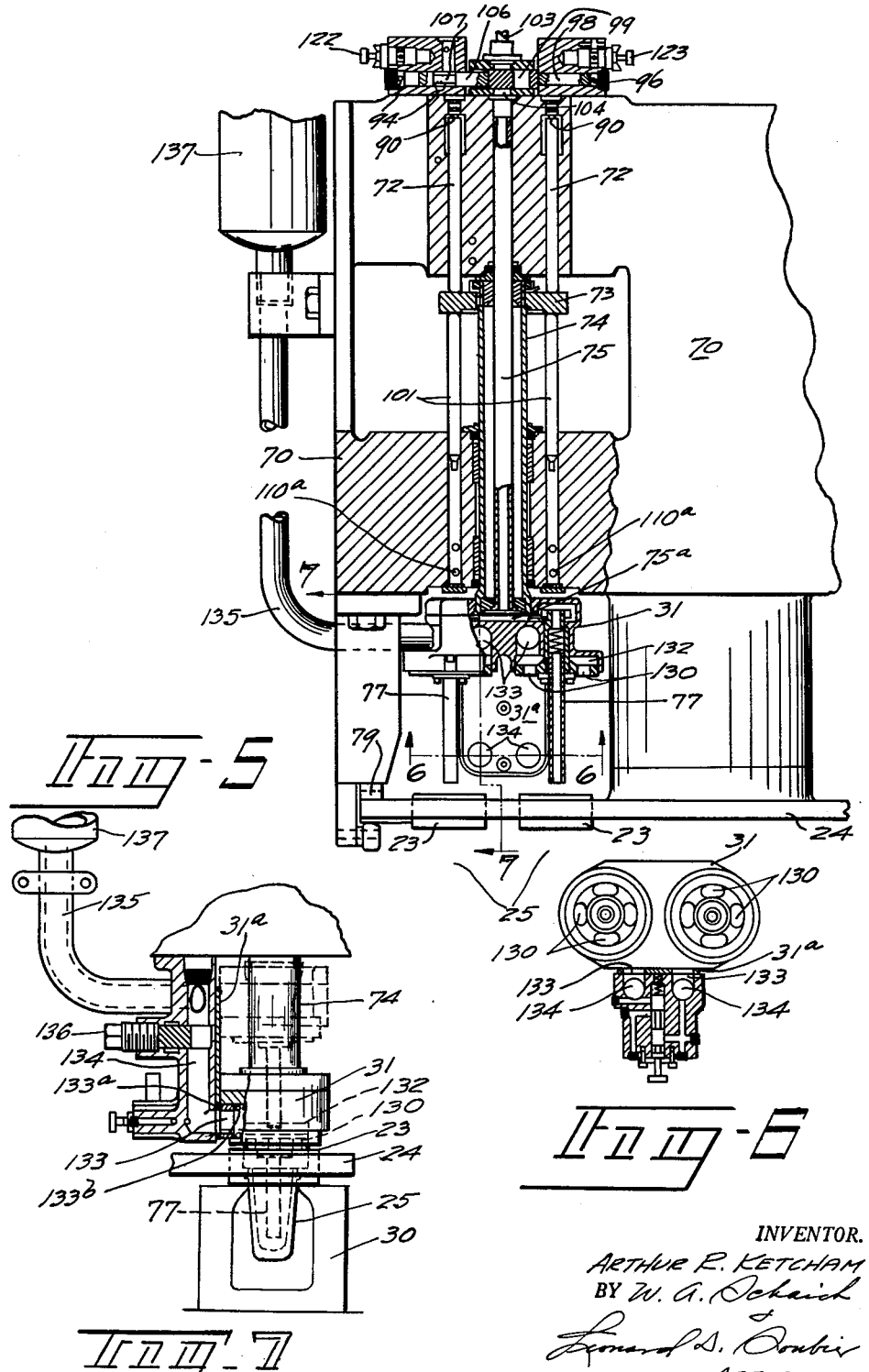

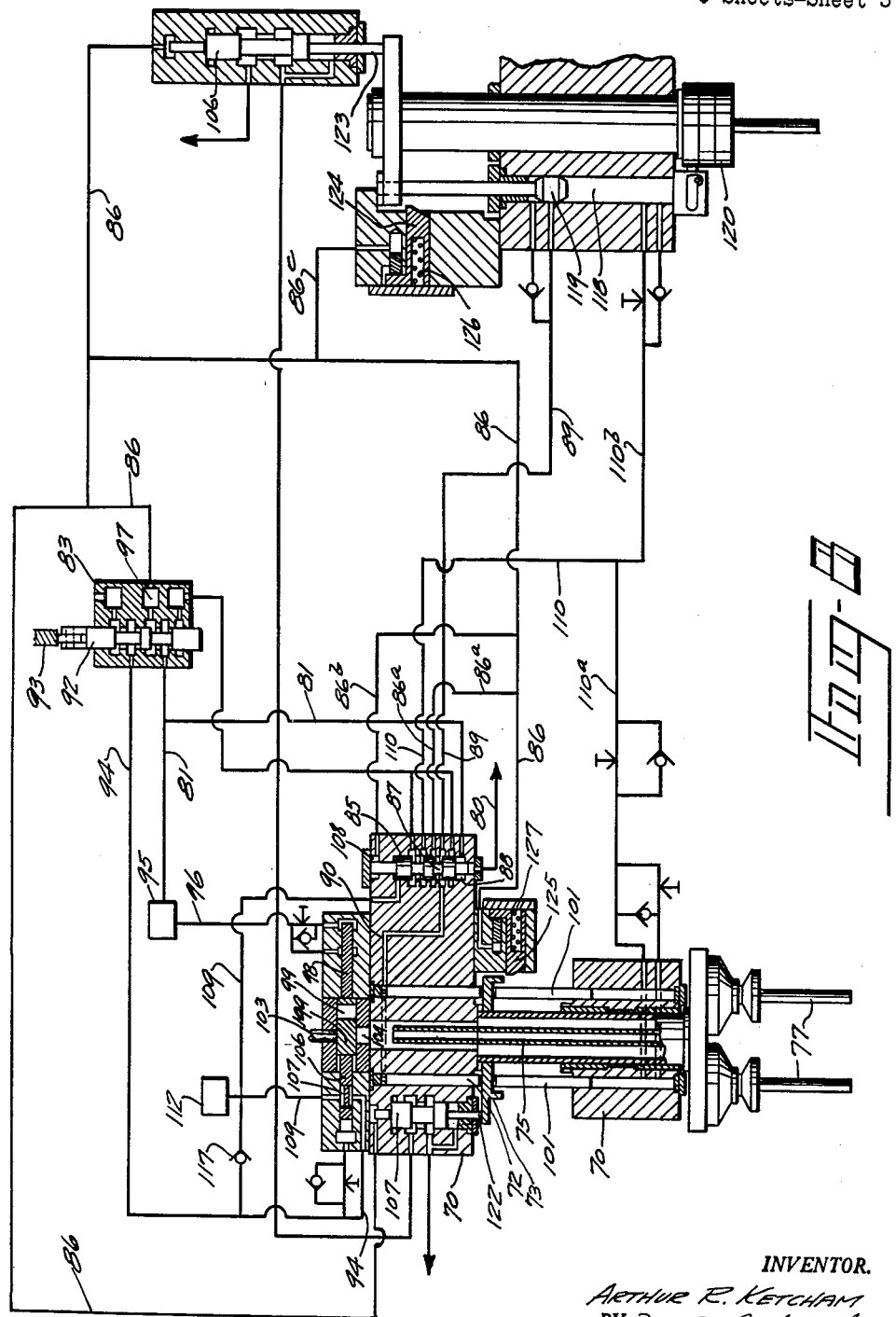

3,137,560
APPARATUS FOR CONDITIONING GLASS
PARISON MOLDS
Arthur R. Ketcham, Toledo, Ohio, assignor to Owens-Illinois Glass Company, a corporation of Ohio
Filed Jan. 7, 1960, Ser. No. 1,031
2 Claims. (Cl. 65—356)

This invention relates to a mechanism for controlling or lessening the noise level in connection with the operation of a glass or other forming machine and in particular in a forming machine where fluid or gases under high pressures are utilized for performing some operation in or upon same.

In most glass forming plants where glass is shaped by some mechanical means it is usual to utilize fluid under pressure as the power source and such power is normally used for the mechanical operation of the machine. Pressurized fluid is also utilized in the blowing means, mold cooling, plunger cooling and or dead plate cooling.

Naturally the mechanical operation will be the least noisy of any of these items because, as a rule, the pressures are contained pressures which are exhausted into a closed system. The operations which will give off the highest noise level will of course, depend upon the type of operation being carried on, i.e., whether the machine be a press and blow, a blow and blow, a suction type or merely a straight pressing machine. In addition whenever high pressure is utilized in connection with the various operating fluids then the noise level is again at a high level. Each of these types of machines will have its own particular noise problem but inherently all will have one problem in common, namely, the cooling of the molds through the flow of a fluid under pressure to or upon the external surfaces thereof and in particular those which are adjacent to the glass shaping surfaces thereof.

In these machines, where the glass is expanded to final form by using fluid under pressure, the particular type of blowing operation used will affect the noise level. For example, when the expansion fluid is contained in the ware, to build up pressure therein, then the noise level is low but when circulation of the blowing fluid is utilized and permitted to exhaust into the open air then the noise level increases in some proportion to the degree of pressure, velocity utilized and exit restriction configuration.

Likewise there are machines in which the mold cooling fluid is circulated in closed channels and in such cases the noise level is of course not very bothersome but in machines where the cooling fluid is used, under high pressures and velocities and permitted to circulate and exhaust to the open air, then the noise level becomes one highly detrimental to the operator of the machine.

Because of this aural detriment upon the operating personnel it is therefore a prime object of this present invention to disclose a method and apparatus which will lower the noise levels to a c.p.s. octave band level in dbs and frequencies in cycles per second which will not be detrimental to personnel.

It is a further object to present a mechanism capable of carrying out this method.

Other objects will be apparent from the attached drawings and disclosure.

As an illustration of the method and apparatus for carrying out my invention, it is disclosed herein as applied to a machine wherein a glass parison is press formed in a parison mold and wherein the glass parison is then blown to final form in a finishing mold by the application of blowing fluid used under high pressure and wherein the said fluid is brought to the parison in a confining channel and is permitted to circulate through the blown article and then exhausted through a muffling system. In this machine the parison mold is cooled through the application of a cooling medium applied through a confining channel and then exhausted through a muffling device.

In the drawings:

FIG. 5 is a sectional elevation view taken at line 5—5 on FIG. 1 and illustrates the blowing mechanism of the machine;

FIG. 6 is a section taken at line 6—6 on FIG. 5 and illustrates the resilient connecting plate mechanism as between the movable blowhead and the exhaust system;

FIG. 7 is a view taken approximately at line 7—7 on FIG. 5 but illustrates the blowheads in blowing position and interconnected to the exhaust system;

FIG. 8 is the fluid flow diagram of the fluid connections for operating the blowheads.

Figure 1:
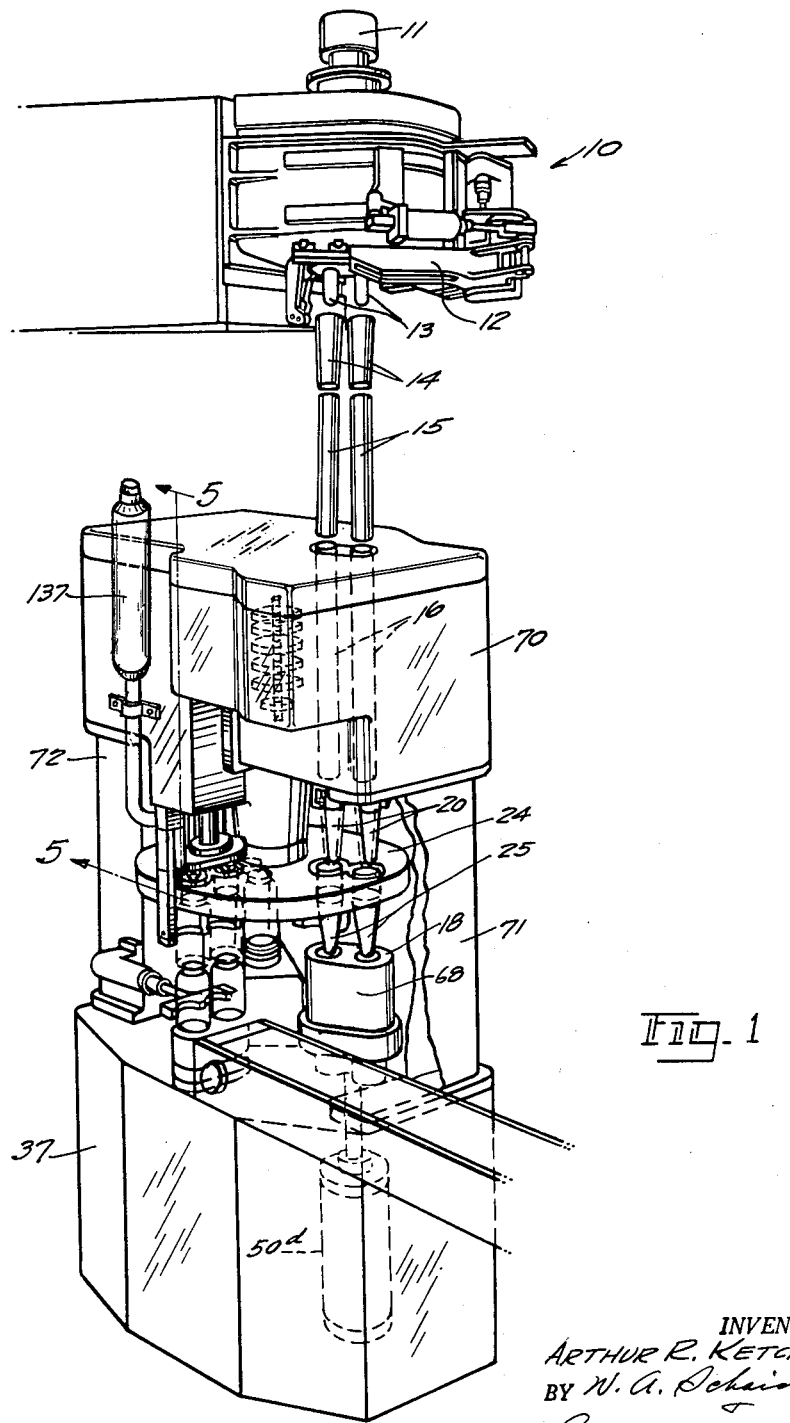
FIG. 1 is an isometric view of a forming machine of the gob fed type, wherein the glass article is blown to final shape and where the blowing fluid is circulated through the article.

In this disclosure, the present invention is illustrated as being applied to a machine of the press and blow type. Referring particularly to FIG. 1 there is illustrated a glass feeding device 10 provided with the usual plunger 11 and glass severing device 12 for forming and severing suspended gobs 13 of molten glass. These gobs 13 are supplied to the forming machine through guide chutes 14, 15 and 16 and deposited in the cavities of a parison mold 18. The parison mold 18 is moved up to the pressing station, and after the charges 13 have been received therein, the pressing plungers 20 are projected downwardly into the glass in the mold to shape a parison therefrom. Neck molds 23, carried by turret 24, cooperate with the parison mold 18 in the formation of a parison 25. With the completion of the pressing of the parisons, the mold 18 and the plunger 20, move vertically away from each other leaving the parisons 25 vertically suspended from the neck molds 23. The turret 24 is then indexed to move the pressed parisons 25 to the blowing station.

At the blowing station the parisons 25 are enclosed by a blow mold 30 (see FIG. 7) and a blow head 31 is then projected downwardly to seat on the neck molds 23 and air under pressure is provided to the inside of the parisons 25 to expand them to the walls of the cavities of the blowing mold 30.

Figure 2:
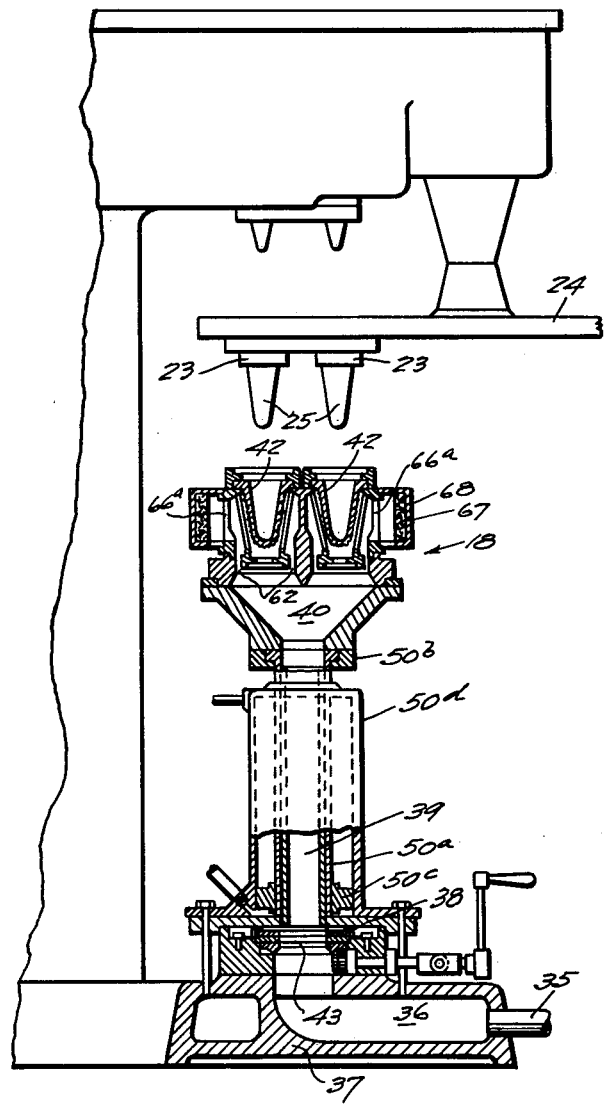
FIG. 2 is a part section elevational view taken at the parison forming station and illustrates the cooling system for the parison mold.

Referring to FIG. 2, the cooling mechanisms for the parison mold is, in its major portion identical with the disclosure in the Denman Patent 2,751,715 and as shown consists essentially of a supply conduit 35 arranged to convey a cooling medium under high pressure and high velocity to a chamber 36 formed in the base 37 of the forming machine proper. This cooling medium leaves the base through an outlet 38 and is carried through a telescopic tubular arrangement 39 to a chamber 40 which surrounds the two shaping cavities 42 of the parison mold 18. An iris type of valve 43 is provided between the chamber 36 and the telescopic members 39 so that the volume of cooling medium provided to the chamber 40 may be regulated to any desired degree.

Figure 3:
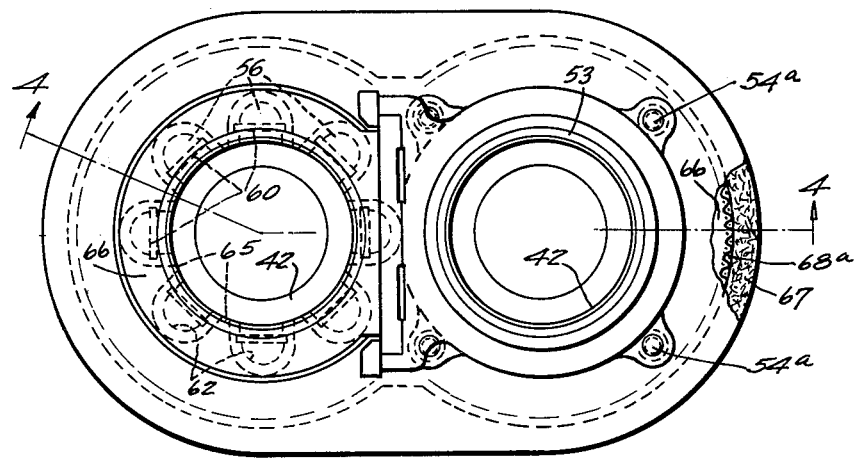
FIG. 3 is a plan view of the parison mold and illustrates the structure of the muffling device therefor.
Figure 4:
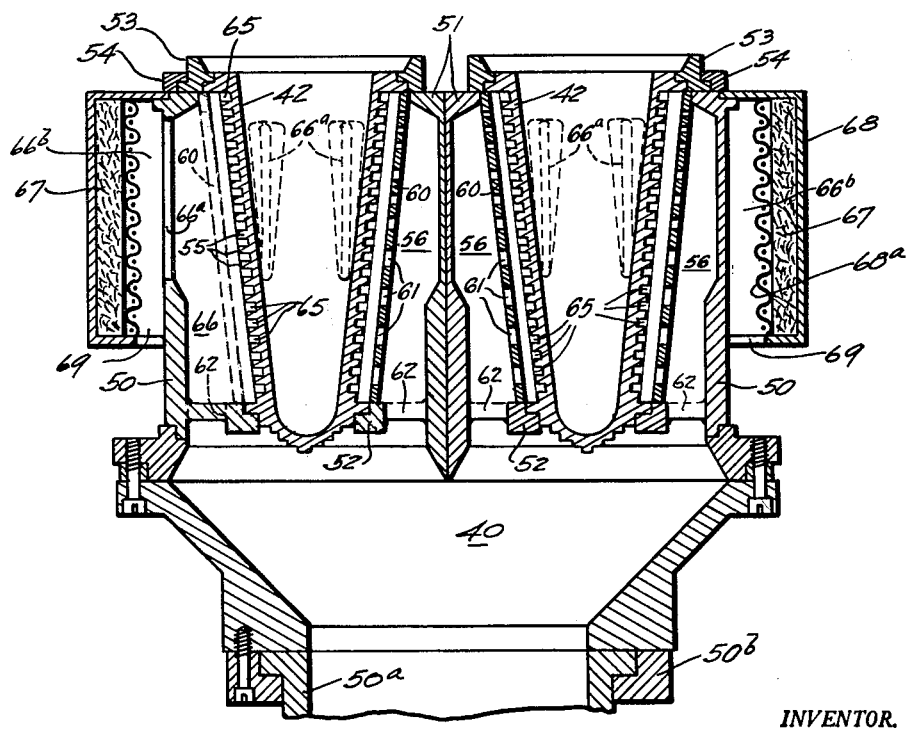
FIG. 4 is a section in elevation taken at line 4—4 on FIG. 3 and further illustrates the muffling device for the parison mold.

Referring in particular to FIGS. 3 and 4 it will be found that the parison mold cavities 42 are mounted in a carrying frame 50 which is provided with upper and lower supporting surfaces 51 and 52 and locked therein by locking rings 53 and 54. The outer locking ring 54 is attached to the frame 50 by means of a series of screws 54ª. The mold carrying frame 50 is attached to the upper end of the piston rod 50ª by means of a clamp ring 50ᵇ and is in turn attached to the piston 50ᶜ of the mold operating cylinder 50ᵈ.

The outer surface areas of the mold inserts 42 are provided with cooling ribs 55 and surrounding these ribs are a series of vertically disposed channels 56 each of which opens toward the mold inserts 42. Each channel 56 is provided with a plate 60 formed with a series of openings 61 through which the cooling medium can issue from channel 56, under high pressure and velocity, to be impinged upon the cooling ribs 55 of the mold inserts 42. These openings 61 are provided in the plates 60 in some predetermined pattern and these channels 56 and plates 60 are spaced from each other circumferentially of the inserts 42. Each cavity will therefore be cooled circumferentially and vertically in a predetermined cooling pattern. The air for cooling the mold inserts 42 is provided from the head 40 and enters into each channel or chamber 56 through the openings 62 and then passes through openings 61 to impinge upon the ribs 55 of the mold inserts 42. This cooling air then passes through the openings 65 between the ribs 55 and into the chamber 66 surrounding each mold insert 42 and then passes out through openings 66ª to chamber 66ᵇ to impinge upon a felt-like member 67 which completely surrounds the two mold inserts. This felt-like member 67 is supported in a frame member 68 carried upon the parison mold support frame 50 and retained in position thereon by a screen member 68ª. The cooling medium then exhausts out of the opening 69 to the atmosphere. The impingement of this exhaust air upon this felt or mat of glass fiber softens the noise and reduces the noise level to a range in a cycle octave band which is not objectionable or detrimental to the operating personnel.

Referring in particular to FIGS. 5, 6, and 7 it will be found that these figures are directed to the blow head mechanism for expanding the parisons to final form in the blow molds 30. In FIG. 5 the upper frame structure 70, of the forming machine, is supported upon the machine base 37 by uprights 71 and 72. This frame member 70 carries the rotatable neck mold turret 24 and its operating mechanism. The neck molds 23, as illustrated in FIG. 5, are carried by the turret 24 and the turret has just come to rest bringing the pair of parisons 25 to the blowing station. The next sequential operation is the closing of the blow molds 30 which may be accomplished in any of the usual or known manners. The blow head 31 will then be moved downwardly by the application of fluid pressure behind the pistons 72 which will in turn apply pressure to the cross head 73 moving the blow head 31 vertically downward. The cross head 73 carries internally thereof a hollow tubular member 74 which has a further tubular member 75 mounted therein and which is in communication with the source of fluid supply for expanding the parisons 25. As the blow head 31 moves downwardly the nozzles 77 also move down and within the hollow parisons 25 to the position shown in FIG. 7.

As the blow head 31 is moved down into blowing position the openings 133 therein are automatically brought into alignment with the exhaust ports 134 thus creating an air travel circuit from the air supply line 103 through opening 104 thence through tubular member 75, nozzles 77, through the ports 133 of members 133ª and 134 outwardly through the exhaust air pipe 135 into the muffler 137. Adjustable valves 136 are interposed the passages 134 for selecting the proper back pressure to be maintained within the hollow parisons 25 to effect their expansion. The members 133ª are held in sealing contact with the plate 31ª by means of springs 133ᵈ. The upward movement of the blow head 31 automatically disconnects the exhaust system.

As the turret 24 is approaching its stop, the blow head 31 is in its up position and the blow molds 30 are starting to close at a rate of movement coordinated with that of the turret so that as the parison comes to rest there is a minimum of lost time until the molds 30 are completely closed. When the turret 24 comes to rest, the turret lock 79 (FIG. 5) is actuated from the main control cam drum and the actuation of the lock permits pressure to flow to line 80 and beneath valve 85. Line 81 has already been pressurized under control of the main control cam 93 and valve 92 which passes pressure from the main valve block 83 to the chamber 88 beneath valve 85. The combined pressure from lines 80 and 81 overcome the force of the constant pressure on the opposite end of valve spool 85 and it shifts to the position shown. In this position constant pressure from line 86 flows through line 86ª and undercut 87 on valve 85 into lines 89 and 90. Line 90 goes to the top of pistons 72 to move the blowhead 31 down into blowing position. Line 89 goes to the upper chamber of the finish cooler 120 and forces it down. The finish cooler 120 per se forms no part of this present invention except only as its fluid operating lines are interconnected into the operating cycle of the main machine.

As the blowhead 31 reaches its down position, the blowmolds 30 have already been closed under pressure from line 81 to the blowmold closing fluid circuit 95 and the closing of said molds pressurizes line 96 moving the piston 98 to the left, in FIG. 8, thus bringing the opening 99 of slide 100 into alignment with the air supply line 103 and opening 104. This will permit blowing air to pass through tube 75 into blowhead 31 and thence through the blowing nozzles 77 to expand the parisons 25 in the blowmolds 30. The blowing air from nozzles 77 will, after the expansion of the parisons, flow through the inside of the blown ware and then upwardly through outlets 130 (FIGS. 5, 6 and 7) to chamber 132, into conduits 133, 134 past restriction 136 and thence through the conduit 135 and muffler 137 to the atmosphere. In this manner the blowing air during its period of travel from its entrance into the blowhead 31, at supply pipe 103, will perform the operation of expanding the parisons and then pass through the muffler 137 to be exhausted therefrom in some major degree of silence.

At the end of blowing period the control spool 92 of the main valve block 83 is shifted by the main cam 93, to pressurize line 94 and open line 81 to the exhaust 97. The pressure in line 94 goes to rear of piston 106 and shifts same to a position which turns the blow air off. When piston 106 is shifted, oil is allowed to flow through the undercut 107 on piston 106 and oil from line 94 will pressurize line 109. Line 109 goes both to the blowmold opening circuit 112 and to chamber 108 at the upper end of spool valve 85. At this time line 81 is open to exhaust thereby removing some of the force on the lower end of spool 85 and it will shift to its lowermost position or the opposite to that shown in FIG. 12.

Constant pressure supply oil in line 86 is allowed to flow through line 86ª into line 110 and 110ª which enters beneath the up pistons 101 on blowhead 31 and through line 110ᵇ to the lower chamber 118 beneath the piston 119 on finish cooler 120. The blowhead 31 and finish cooler 120 are forced to move up by this oil pressure. The down pistons 72 of the blowhead 31 are open to exhaust at this time. Next, the down piston (not shown) of the turret lock 79 is disengaged, removing the rest of the force from the bottom of the spool 85, but it has already shifted so nothing happens. Then spool 92 is shifted by cam 93 and this pressurizes line 81 and exhausts line 109 through check valve 117, the force on the bottom of spool 85 is still smaller than that on top and nothing happens. At this point the cycle repeats as set forth above.

Valves 122 and 123 are safety valves which are so arranged as to prevent the turret 24 from indexing unless the blowhead 31 and finish cooler 120 are in up position and holding these valves open. When the blowhead 31 and finish cooler 120 are down, 122 and 123 act as check valves allowing oil flow in one direction only, thereby allowing oil to flow to the turret motor drive case return (not shown).

Locks 124 and 125 are held in position shown by constant pressure oil and are actuated by springs 126 and 127 respectively to hold the blowhead 31 and finish cooler 120 up when the oil pressure is cut off.

The general operation of this present invention is about as follows: A pair of gobs 13 of molten glass are severed from the feeding device 10 by a shearing mechanism 12 and these gobs pass through the gob guides 14, 15 and 16 into the parison mold cavities 42. The pressing plungers are moved into pressing position and press the glass in the parison molds into parisons 25. The mold 18 and the plungers 20 are then retracted from the glass leaving these parisons 25 vertically suspended from the neck molds 23.

The turret 24 is then indexed moving the suspended parisons from the pressing station to the blowing station where they are encompassed by the blow molds 30. With the closing of the blow molds 30 the blowhead 31 is moved downwardly by the pistons 72 to thereby project the blow nozzles 77 into the hollow center portions of the parisons 25. Simultaneous with the seating of the blowhead 31 on the neck molds 23, the piston 106 at the top of support 70 is moved laterally to bring the port 104 into communication with a source of supply of blowing air from supply pipe 103. This blowing air passes downwardly through the tubular member 75 to and through a chamber 75ª and thence through the nozzles 77 to apply pressure internally of the parisons and expand them to the cavities of the blowmold 30.

When the blowhead 31 moved down to the blowing position, it automatically brought a pair of ports 133 into communication with the exhaust system 134, 135 and 137 thus when the blowing air is admitted through the nozzles 77 and the parisons are expanded the blowing air then exhausts through these ports 130, 133, 134 and 135 and then through the muffler 137 which is arranged to muffle the exhaust noise. In this manner the high pressure air is passed to the atmosphere without the usual noise level which accompanies the exhaust air under high pressure.

During the time that the parisons are being formed in the parison molds the parison molds 42 must, of course, be maintained at an optimum operating temperature which may be in the approximate range of 950° F. In order to do this, air under high pressure and high velocity is provided from a source 35 and passed upwardly through a hollow telescopic piston member 39 into a chamber 40 beneath the plural parison molds 42. This high pressure high velocity air then passes upwardly through openings 62 into chamber 56 and outwardly therefrom through outlets 61 formed in the plates 60 and these openings 61 are arranged in a definite pattern form, to be impinged upon the ribs 55 of the mold cavities 42. This impinged air then exhausts through the openings 65 between the ribs 55, into chambers 66 thence through ports 66ª to chamber 66ᵇ where it impinges upon a matted felt member 67 which acts as a sound deadening member. The air then escapes to the atmosphere through the opening 69 surrounding the mold frame 50. In this circuit the high pressure high velocity air passes through a confined channel which extends from its source 35 to the point of ultimate exhaust namely the muffler 67 and during its passage through this confining channel it is caused to act upon the exterior surfaces of the mold cavities 42 to cool them and maintain them at an optimum operating temperature.

From the foregoing it will be noted that in both instances, namely, the blowing of the ware to final form and the maintaining of the blank mold optimum operating temperature, the fluid or pressure air is passed through a confining channel and during the passage to said channel it is required to work for a predetermined time interval, for example, in the first instance it acts to expand the parisons to final form and in the second instance it acts to maintain the blank mold at an optimum operating temperature. In other words, this gaseous medium is caused to pass through a channel to and through at least one of the actuating mechanisms of this glass forming machine.

Modifications may be resorted to within the spirit and scope of the appended claims.

I claim:

1. In an apparatus for temperature conditioning glass parison forming molds wherein compressed air is impinged on the external surfaces of the mold, means for supporting a parison mold in an upright position, a plurality of circumferentially spaced, vertically extending, chambers mounted on said support in surrounding relationship to said mold, means connecting said chambers to a source of high pressure, high velocity air, a plurality of openings formed in said chambers in the sides thereof which face the mold, for directing air onto the external surface of said mold, each chamber being spaced from the next adjacent chamber to provide exhaust openings for the air after impingement, a hollow cylindrical member circumferentially surrounding said mold and chambers and spaced a predetermined distance therefrom, said hollow member having a height at least as great as the height of said exhaust openings, and a felt-like sound absorbing medium fixed to the inner wall of said hollow member.

2. An apparatus for blowing and cooling articles of glassware in an open topped mold comprising a stationary frame, a hollow blow head, means mounted on said frame and connected to said blow head for vertically reciprocating said head into engagement with the upper surface of said blow mold, a laterally extending passage within said blow head, a vertically disposed, stationary plate mounted on said frame and extending parallel to the path of movement of said blow head, a spring biased sleeve slidably received in said passage and sealingly abutting said plate, said plate having an opening formed in the face thereof adapted to coincide with the opening in said biased sleeve when said blow head is in engagement with said mold, a muffler attached to said frame and means connecting said muffler to the opening in said plate.

References Cited in the file of this patent

UNITED STATES PATENTS

| | | |
|---|---|---|
| 2,123,145 | Peiler | July 5, 1938 |
| 2,128,742 | Fuehrer | Aug. 30, 1938 |
| 2,282,848 | Berthold | May 12, 1942 |
| 2,561,726 | Cherain | July 24, 1951 |
| 2,751,715 | Denman | June 26, 1956 |
| 2,928,214 | Mumford | Mar. 15, 1960 |